July 16, 1946.　　T. S. DONNELLY, JR　　2,404,125
ELECTRODE HOLDER
Original Filed Feb. 19, 1943　　2 Sheets—Sheet 1
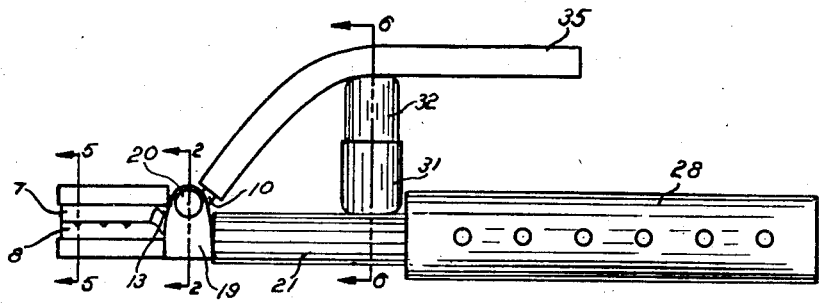
Fig. 1
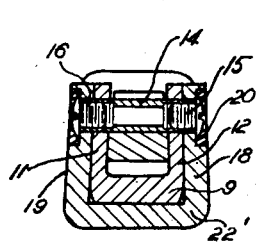
Fig. 2
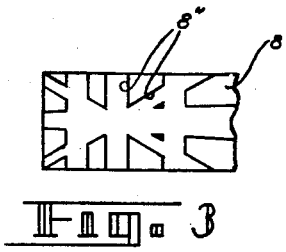
Fig. 3
Fig. 4
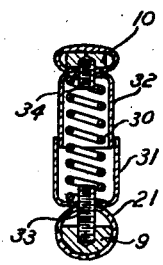
Fig. 6
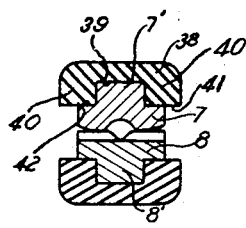
Fig. 5
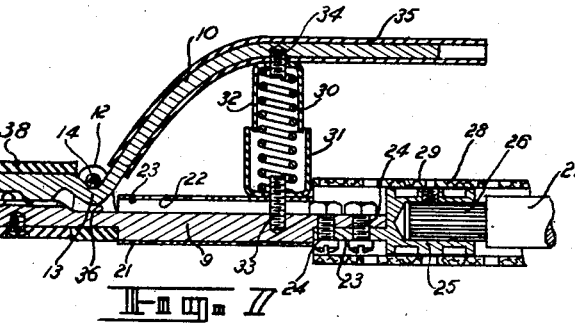
Fig. 7
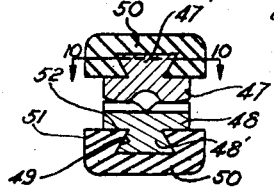
Fig. 8
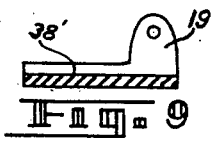
Fig. 9
INVENTOR.
THOMAS. S. DONNELLY, JR.
BY
HIS ATTORNEY July 16, 1946.     T. S. DONNELLY, JR     2,404,125
ELECTRODE HOLDER
Original Filed Feb. 19, 1943    2 Sheets-Sheet 2

INVENTOR.
THOMAS S. DONNELLY, JR.
BY
HIS ATTORNEY

Patented July 16, 1946

2,404,125

UNITED STATES PATENT OFFICE 2,404,125

ELECTRODE HOLDER

Thomas S. Donnelly, Jr., Detroit, Mich., assignor to Bordon Mfg. Co., Inc., Detroit, Mich., a corporation of Michigan Original application February 19, 1943, Serial No. 476,479. Divided and this application December 11, 1943, Serial No. 513,945

3 Claims. (Cl. 219—8)

This application constitutes a division of my co-pending application Serial No. 476,479, filed February 19, 1943, on an electrode holder.

The present invention relates to a new and useful improvement in an electrode holder used in arc welding operations. It is an object of the present invention to provide in an electrode holder a pair of gripping jaws having insulating means mounted thereon whereby the insulating means will serve to insulate the jaws from heat and electricity, and whereby the jaws themselves will serve as reinforcement for the insulation.

Another object of the invention is the provision in an electrode holder of a pair of gripping jaws having insulating means mounted thereon which may be easily and quickly removed and replaced.

Another object of the invention is the provision in an electrode holder of jaws and insulated medium so constructed and arranged that a maximum insulation is provided, while permitting a maximum conductivity.

Another object of the invention is the provision in an electrode holder of jaws having projections extending outwardly from the outer face thereof which will serve as a means for mounting insulating plates in position.

Another object of the invention is the provision in an electrode holder of a member for engaging an electrode and having insulation mounted thereon in a slip fit and provided with resilient means inter-engaging the insulation and the electrode engaging member for resisting the removal of the insulation from the electrode engaging member.

Other objects will appear hereinafter.

It is recognized that various modifications and changes may be made in the detail of structure illustrated, and it is intended that such variations and modifications shall be embraced within the scope of the claims which form a part hereof.

Forming a part of this specification are drawings in which,

Fig. 1 is a side elevational view of the invention.

Fig. 2 is a sectional view, slightly enlarged, taken on line 2—2 of Fig. 1.

Fig. 3 is an inside fragmentary plan view of the end of the lower jaw.

Fig. 4 is a plan view from the inside of the end of the upper jaw.

Fig. 5 is a sectional view, slightly enlarged, taken on line 5—5 of Fig. 1.

Fig. 6 is a sectional view, taken on line 6—6 of Fig. 1.

Fig. 7 is a longitudinal central sectional view of the invention.

Fig. 8 is a view similar to Fig. 5 showing a modified form of the invention.

Fig. 9 is a fragmentary central vertical sectional view illustrating a slight modification.

Figure 13:
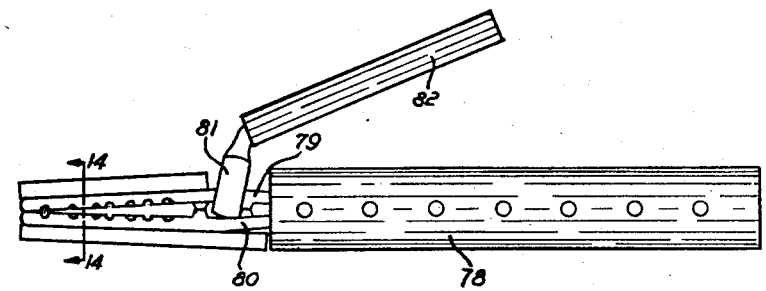
Fig. 13 is a fragmentary side elevational view of a different type of electrode holder embodying the invention.

In the drawings I have illustrated the invention comprising a pair of gripping jaws 7 and 8, a supporting prong 9 projecting rearwardly from the jaw 8, and a trigger handle 10 projecting rearwardly from the jaw 7.

Extending upwardly from the prong 9 is a pair of spaced lugs 11 and 12, between which the downwardly turned portion 13 of the trigger handle 10 engages. Projecting through the lugs 11 and 12 is a metallic member 14, which may be formed tubular and internally threaded, or which may be bored at its ends and internally threaded for reception of screws 15 and 16 which serve to retain the pivot member 14 in position, and which serve to secure the legs 18 and 19 of a U-shaped strip of insulating material in position so as to cover the outer faces of the lugs 11 and 12. This U-shaped member is made from any desirable heat and electrical insulating material, such as fiber, asbestos composition, or the like. The outer faces of the screws 16 are covered by a layer 20 of suitable insulating plastic material, such as plastic wood, putty, or the like. Slipped over the prong 9 is a tube 21 formed from fiber or other suitable insulating material, and having openings 22 formed in its front face to provide a channel or flue 23 through which the air is permitted to flow for cooling purposes.

It will be noted that the end of the tubular insulating member 21 butts against the bight 22' of the U-shaped member. The rear end of the prong 9 is secured to a metallic tongue 23 by means of the bolts 24. This tongue 23 projects outwardly from the shank or socket-bearing member 25 in which the bared end 26 of the conductor or cable 28 is secured. This may be secured by means of solder, a set screw, or in any other suitable manner. Embracing the butt end of the prong 9 and the shank 25 is a handle 28 formed from fiber or other suitable material. A set screw 29 carried by the shank 25 serves as a means for securing the handle 28 in position. By backing the set screw outwardly, the shank 25 is clamped in fixed relation to the handle 28.

A coil spring 30 is embraced by the telescoping cup-shaped members 31 and 32 which are formed from fiber or other suitable heat and electrical insulating material. Studs 33 and 34 serve as a means for retaining the cup members 31 and 32 in position. A tube 35 of insulating material is slipped over the trigger handle 10 and the stud 34 projects through this tube 35.

It will be noted that between the upper face of the prong 9 and the opposed face of the portion 13 of the trigger there is a clearance 36. When the trigger handle 10 is pressed downwardly toward the prong 9 against the compression of the spring 30, the portion 13 will move downwardly and bear against the face of the prong 9, and when in clamping position, the pivot pin 14 and the portion 13 will be in the position shown in Fig. 7. In this way I have provided a floating mounting. This effects a more rigid clamping of an electrode between the jaws 7 and 8 as it permits the jaws to move toward parallel relation within certain limits.

Figure 15:
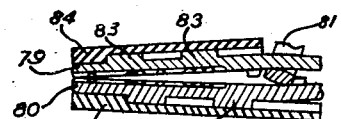
Fig. 15 is a longitudinal central sectional view of the jaws illustrated in Fig. 13.
Figure 11:
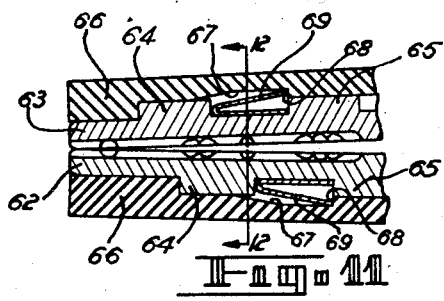
Fig. 11 is a fragmentary longitudinal sectional view of a jaw showing a modified form of construction.

Extending outwardly from the outer faces of the jaws are projections which serve as mountings for insulation plates to protect the jaws against contact with live bodies. These projections may be longitudinally directed ribs 7' and 8' respectively, as shown in Fig. 5, or they may be separated bosses, as shown in Fig. 11 and Fig. 15.

In the form shown in Fig. 5, these ribs 7' and 8' are shown integral with the jaws 7 and 8. It is believed obvious that they may be formed as separate pieces and secured to the jaws 7 and 8 by screws or the like. The opposed face of the jaw 8 is provided with grooves 8" as shown in Fig. 3, and the opposed face of the jaw 7 is provided with the grooves 7" as shown in Fig. 4. It is generally the custom to place the electrode in engagement with one of these grooves before the jaw 7 moves into clamping relation therewith.

I provide insulation for the jaws 7 and 8 but this insulation is not mounted on the jaws. As clearly shown in Fig. 5, the insulation embodies a plate 38 having a central groove 39 formed in one of its faces. This groove is of such size as to receive snugly the rib 7' or 8', and the plate 38 is of such a width as to extend beyond opposite side faces of the jaws 7 and 8.

It will also be noted that the side portions 40 of this plate 38 bear at its face 41 against the outer face 42 of the jaws 7 or 8, as the case may be. Experience has shown that with insulation mounted in this manner, a more durable type of construction is afforded than if a channel member were to be used with its legs overhanging the faces of the jaws. In order to fracture the portions 40, it is necessary either that the plate 38 be moved outwardly from the rib 7' or 8', or that the portions 40 be moved inwardly away from the outer portion of the plate 38. The engagement of the portions 40 with the faces 42 prevents this inward movement and since the plate 38 is generally fastened rigidly to the rib 7' by means of screws or the like, outward movement of the plate 38 is prevented so that fracture of the side portions of the insulated piece is rendered much more difficult. Moreover, the side portions 40 are of considerably greater thickness than would be the case were these portions to overlie the jaws 7 and 8 while retaining the same width of plate 38. Consequently, there is a larger body of insulating material on the portions 40 for resisting heat and the burning effect of the arc.

In Fig. 8 I have shown a slightly modified form of construction in which the jaws 47 and 48 correspond to the jaws 7 and 8 shown in Fig. 5. The ribs 47' and 48' correspond to the ribs 7' and 8' shown in Fig. 5. It will be noted that these ribs 47' and 48' are formed dove-tailed in cross-section and are adapted to engage in the dove-tailed grooves 49 formed in the insulating plate 50. The portions 51 of the insulation plate engage the outer faces 52 of the jaws 47 and 48. These insulation plates 50 may be driven on the ribs 47' and 48' as a press fit, and thus the use of screws for securing the insulation plates on the ribs 47' and 48' may be dispensed with. This would prevent any possibility of arcing a screw and would permit removal of the same for replacement of the insulation plates. This construction also would permit the insulation plates to be driven off and replaced by the operator on the job. In this way, the operator, being provided with extra insulation plates 50, would always be in a position to remove easily and quickly worn insulation plates so that he could always be assured of an electrode holder having properly insulated parts.

In Fig. 9 I have shown a construction in which the insulating members 18 and 19 are formed integral with the insulation plate 38'.

Figure 10:
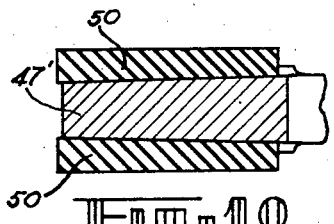
Fig. 10 is a fragmentary sectional view taken on line 10—10 of Fig. 8.

In Fig. 10 it will be noted that the rib 47' is indicated as slightly wedge-shaped so that when the insulation pieces 50 are driven on the wedge construction will serve to provide a binding press fit.

In Fig. 11 I have shown a pair of jaws 62 and 63 carrying the outwardly projecting spaced apart bosses 64 and 65 onto which the insulation plates 66 may be driven. Each of these plates is provided with a recess 67 to provide a shoulder 68 engageable against which is one end of a leaf spring 69 doubled upon itself and bearing at its outer end against the boss 64. The construction is such that the insulation plate may be driven on and in passing over the outer part of the spring 69, the same will be compressed and serve to snap upwardly behind the shoulder 68, thus resisting removal of the insulation plate.

Figure 16:
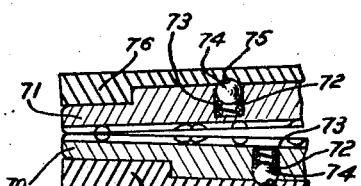
Fig. 16 is a fragmentary longitudinal section showing a modified form of construction.
Figure 12:
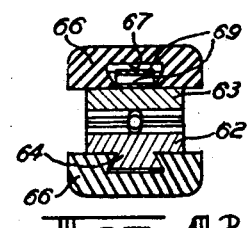
Fig. 12 is a sectional view taken on line 12—12 of Fig. 11.

A similar construction is shown in Fig. 16 in which I have illustrated a pair of jaws 70 and 71, each having a part 72 formed therein in which is positioned a coil spring 73 bearing against a ball 74, which will serve to snap into the recess 75 formed in the insulation plate 76 so as to resist the removal of the insulation plate.

In Fig. 13 I have shown a modified type of electrode holder embodying a handle 78 projecting outwardly from which is a pair of resilient jaws 79 and 80 springable apart by the stirrup 81 carrying the handle 82.

Figure 14:
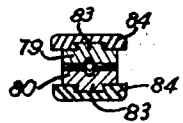
Fig. 14 is a transverse sectional view taken on line 14—14 of Fig. 13.

As shown in Fig. 14, each of the jaws 79 and 80 is provided with the outward dove-tailed projection 83 on which the insulation plate 84 may be spread.

Fig. 15 is a longitudinal sectional view of the jaws shown in Fig. 13 and as indicated the bosses or outwardly projecting ribs 83 may be spaced apart longitudinally.

It is thus seen that I have provided outward projections which may fit into recesses or grooves formed in the insulation plates and which will serve as retaining means for these insulation plates.

What I claim as new is:

1. In an electrode holder of the class described, an electrode clamping jaw having a back face and a front face; an outwardly projecting rib on said back face, said rib being longitudinally tapered; an insulation plate having a groove formed in one of its faces for reception of said rib, said groove being tapered and slidable on said rib and engaging therewith as a press fit, said plate being of greater width than said jaw and projecting laterally outwardly from the sides thereof.

2. In an electrode holder of the class described, an electrode clamping jaw having a back face and a front face; an outwardly projecting rib on said back face, said rib being longitudinally tapered; an insulation plate having a groove formed in one of its faces for reception of said rib, said groove being tapered and slidable on said rib and engaging therewith as a press fit, said plate being of greater width than said jaw and projecting laterally outwardly from the sides thereof; and means interengageable between said rib and said plate for preventing separation of the same.

3. In an electrode holder of the class described, an electrode clamping member for engaging an electrode in clamping relation; an insulating member mounted on said electrode clamping member as a slip fit; and spring pressed balls interengaging said electrode clamping member and said insulation, in clamping relation, for resisting removal of the insulation from the clamping member, said balls being seated in pockets in the clamping member.

THOMAS S. DONNELLY, Jr.